Aug. 20, 1940.  J. L. KELLY  2,211,952
DENTAL INSTRUMENT
Filed May 3, 1937
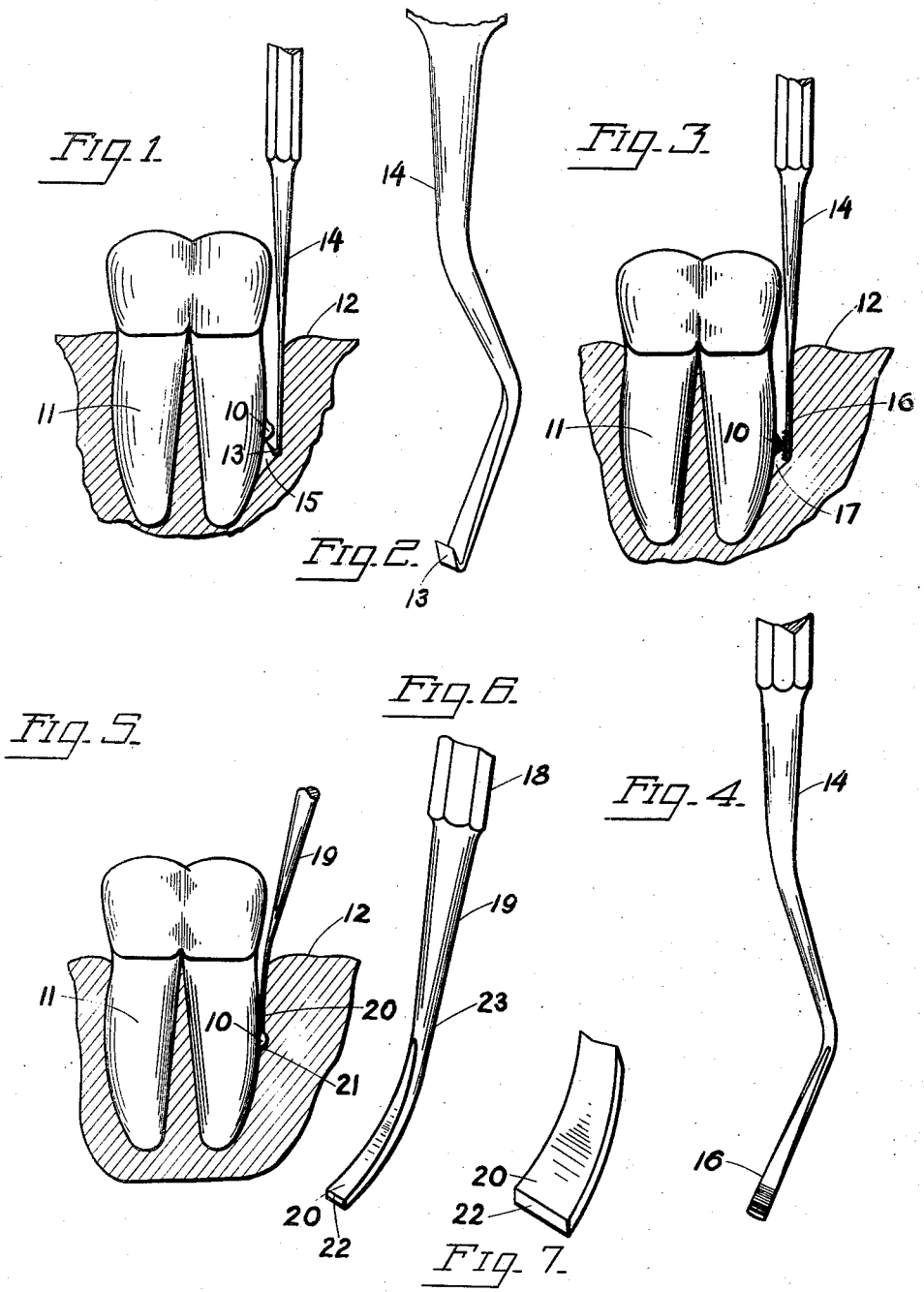
INVENTOR.
JOHN L. KELLY
BY
ATTORNEY.

Patented Aug. 20, 1940

2,211,952

UNITED STATES PATENT OFFICE 2,211,952

DENTAL INSTRUMENT

John Lawrence Kelly, New York, N. Y.

Application May 3, 1937, Serial No. 140,334

8 Claims. (Cl. 32—50)

This invention relates to improvements in dental instruments, and more particularly to an instrument useful in the treatment of pyorrhea, Riggs' disease, gingivitis and similar diseases and conditions in which a purulent inflammation of the dental periosteum with progressive necrosis of the alveoli and looseness of the teeth occurs.

In such diseases of the teeth there are present pus pockets underneath the gums on the root surfaces of the teeth and there are deposits on these surfaces within the pus pockets. In some cases of periodontal pyorrhea, pus pockets are very deep.

The present invention relates more specifically to a deposit explorer and a method of using the same to determine the depth of pus pockets and the position and character or texture of the deposits underneath the gums on the root surfaces of teeth within the pus pockets.

An object of the invention is to provide an instrument with which the aforesaid deposits may be detected and the formation of the deposit determined and the deposit removed, leaving a smooth clean tooth surface without scratches, grooves or nicks in the cementum or root surface.

Another object of the invention is to provide a deposit explorer as hereinafter described in detail.

Other objects of the invention will be apparent from the following description in which one form of instrument is described in detail.

In order that a clear understanding of the improved instrument herein described and claimed can be obtained, brief reference will be made and some illustrations given of the methods and instruments heretofore in common use, and a brief comparison made between these and the improved instrument herein described.

In the accompanying drawing:

Figure 1 is a diagrammatic representation of a tooth and an instrument applied thereto of the well-known hoe type, the figure illustrating the relative position of the instrument in respect to the tooth when removing a deposit from a root surface;

Figure 2 is a greatly enlarged view of the end of the hoe type instrument shown in Figure 1;

Figure 3 is a diagrammatic representation of a tooth and an instrument applied thereto of the well-known or cross-file type, the figure illustrating the relative position of the instrument in respect to the tooth when removing a deposit from a root surface;

Figure 4 is a greatly enlarged view of the end of the cross-file type instrument shown in Figure 3;

Figure 5 is a diagrammatic representation of a tooth and an instrument applied thereto illustrating the method of using the instrument constituting this invention;

Figure 6 is a view greatly enlarged of the end of the improved instrument herein described and claimed; and Figure 7 is a view greatly enlarged, of the planing end of the instrument shown in Figure 6.

The deposits to be located on the teeth in connection with the conditions hereinbefore referred to are usually calcareous in character, such as a dental calculus, the ordinary tartar of the teeth which consists of a salivary deposit of calcium phosphate and carbonate with organic matter. These deposits form underneath the gums on root surfaces and permit bacteria to form, acting as a mechanical irritation, reduces the resistance of the cells to the invasion of bacteria, thus forming pus pockets in the adjoining gum, giving rise to the diseases above mentioned, and others.

One step in the necessary treatment is to locate and remove these deposits and as they cannot be dissolved with any substance that can be safely used in the mouth, it is necessary to mechanically remove them from the root surface. Obviously, to do this, it is necessary to displace the gum adjacent the roots of teeth in order to permit the instrument to find and remove the deposit. Obviously, it is desirable to displace the gum as little as possible and to reduce the irritation of the gum to a minimum when performing this operation.

Before the invention of the instrument herein described, it was customary to use instruments of which those illustrated in Figures 1–4 inclusive are typical. In all cases such instruments have two things in common; first, the shank of the instrument is substantially rigid and inflexible as compared with the instrument constituting this invention to be presently described; and secondly these known instruments were all equipped with some kind of an abrading point adapted to either hoe or file or scrape deposit from the root of the tooth.

At this point, it may be pointed out that the removal of these deposits is largely dependent upon the "feel" of the instrument in the dentist's hands when the instrument encounters the deposit. The deposit has a different "feel" from the normal clean surface of the root of the teeth. It is difficult to describe this feel, but it may be said that compared with the smooth tooth surface, a deposit feels rough and granular, and in most cases the deposits are nodulus and therefore their presence is readily detected by the feel of the instrument in the hand as it passes over these nodules.

With the known instruments such as shown in Figures 1–4 inclusive, the deposit 10 on the tooth 11 below the gum line 12 is first located with the hoe type instrument shown in Figures 1 and 2, by bringing the lower end 13 thereof into engagement with the deposit. Having thus located the deposit by the feel of the same, the dentist would then pull the instrument upwards and the hoe-like end of the instrument passing over the deposit, would remove some of it. This action is continued until all of the deposit is completely removed.

Obviously, to accomplish this operation, it is necessary for the shank 14 of the instrument to be substantially inflexible for if not, the hoe-like end 13 could not firmly engage the deposit 10 to remove the same, and in consequence of the employment of this inflexible shank, the gum 12 is pushed away from the tooth surface and furthermore, as the hoe-like end 13 must extend laterally from the shank, the gum is pushed away from the root of the tooth as indicated at 15.

Because of the fact that the shank 14 must be made substantially inflexible, the operation of locating the deposit 10 cannot be as delicately determined as with the improved form of instrument to be presently described, for obviously, the whole instrument must be made quite heavy to be used as the cutting edge thereof must not spring out of engagement with the deposit 10.

In connection with the cross-file type of instrument shown in Figures 3 and 4, the same general conditions apply as described in connection with the instrument shown in Figures 1 and 2. The cross-file type of instrument has a serrated head 16. The shank 14 must be stiff enough to insure that the blades or ridges on this head 16 can be held firmly against the deposit 10 and the instrument is then given an up-and-down vertical motion so that these blades or ridges will file off the deposit.

Obviously, in order to permit of this up-and-down motion and to permit of the insertion of the inflexible shank 14 between the gum and the teeth, a space 17 will be formed below the instrument, and the lack of ability to delicately locate the deposit and to remove the same is present with the cross-file type of instrument as well as with the hoe type.

The improved instrument constituting this invention is illustrated in Figures 5 to 7. Referring to Figure 5, an instrument generally denoted by the numeral 18 has a shank 19 which tapers downwardly and is flattened as hereinafter described and which terminates in a comparatively broad, flat end at 20. This instrument inserted vertically between the teeth and the gum displaces the gum to a minimum extent and as the dentist pushes the instrument downwardly, it will encounter the deposit 10 and the dentist will immediately feel the same because of the lightness and delicacy of the shank 19 at 23. He then planes the deposit from the root of the tooth by repeatedly pushing the instrument down against the projection. As the point 20 of the instrument does not extend laterally, does not have any hoe or blade thereon, it does not displace the gum at the point 21 to the extent of the instruments previously described. Therefore, laceration and displacement of the gum is much less when using this improved method.

The cutting edge 20 of the instrument 18 is a flattened surface at an angle to the shank 19 and lying wholly within the cross sectional plane thereof, as distinguished from the cutting surfaces of the instruments shown in Figures 1-4 inclusive, which cutting surfaces extend laterally from their shank.

Figure 6 is an enlarged view of a preferred form of the improved instrument. It is obvious that this, like the instrument shown in Figures 1-4 inclusive may have a shank so shaped that the working end or blade of the instrument may be brought into proper engagement with teeth located in any part of the mouth. Such modifications in the shape of the shank are well known, and the only requirement to be observed in connection with the shape of this improved form of instrument is that the shank as a whole, shall be of such dimensions and resiliency as to properly transmit the "feel" of the deposits to the hand of the dentist and so that the dentist can also feel the planing action to which the tooth is subjected by the instrument when removing deposit in order that the dentist can definitely determine when the deposit is fully removed.

It may also be pointed out that this new and improved instrument may be used to give a fine finish or make smooth the cementum or root surface within pus pockets instead of the awkward files, chisels or hoes that have been previously used in the removal of foreign matter and that the improved instrument differs from all other instruments used in the fact that it is not constructed to be used as a scaler, chisel, file or hoe. It is used similarly to a plane, being made in various shapes to fit the tooth root surfaces and with the flat end 22 constituting the blade, adapted to be applied at a right angle to the root surface. While held in line with the axis of the tooth, the end 22 is pushed along the root surfaces and the edges act as a plane to remove the foreign matter.

In the embodiment shown by way of example in Figure 6, the flexible shank extending upwardly from the working end has a curved "set" and the planing edge formed where the surfaces 20 and 22 join may form a terminus of the concave side of the curve. When this edge is applied against the wall of the tooth with the concave surface facing the tooth, the dentist may apply lateral pressure which straightens out the flexible curved portion and the cutting surface travels along the surface of the tooth in almost substantially parallel relation. When the tool is moved longitudinally, the act of flexing the tool keys the dentist up for the "feel" and any foreign matter on the tooth may be immediately detected and planed away.

The figures being enlarged, do not indicate the relative proportions of the parts of the shank 19. The upper part of the shank 19 of said instrument where it joins the handle 18 is comparatively rigid, but the lower part is made of a certain degree of flexibility so that it will bend somewhat in order to permit the planing end 20 to lie substantially flat against the root surface as shown in Figure 5. This brings the surface of the flat end 22 forming the blade at practically a right angle to the tooth surface so that the edges thereof may act as a plane when the instrument is pushed downward.

Should the deposit 10 be too unyielding, the flexibility of the lower part of the shank 19 will permit the end 20 to spring outwardly and ride over the deposit but some of it will be planed away. This operation is repeated until the deposit is planed away and the dentist determines by the "feel" of the instrument that he has reached the tooth surface.

It will immediately become apparent that if the shank of the instrument used were rigid as is the case with any instrument that must be used as a rasp, file, hoe or scraper, that it would be impossible to "feel" the deposits 10 to the same degree as they may be felt with the improved instrument herein described, and it will be found that because of the resiliency of the shank of the improved instrument that the pressure of same may be varied from a maximum to a minimum and yet the sensitivity of the "feel" may be preserved at a maximum throughout the range of pressure applied. For example, in locating a very small deposit, if the shank were rigid, the "feel" would be entirely different from what it is found to be with a lighter and more resilient shank and yet the shank must be of sufficient strength to enable the instrument to be used as a plane, as herein described. It is impossible to give in this specification, the exact dimensions and resiliency necessary to meet all conditions. It is therefore sufficient to state that instruments of widely differing shapes and characteristics may be used provided that the same have a flat planing end as shown at 22 in the accompanying drawing, and that the shank of the instrument between said planing end and the rigid portion of the instrument be made sufficiently flexible for use in connection with that particular character of work for which the instrument is used.

A typical instrument of the improved form herein described may have a total over-all length of 7 inches and may have a handle portion approximately $\frac{3}{16}$" in diameter. The shank 19 extending therefrom may have a diameter where it joins the handle or slightly below said junction point of approximately $\frac{3}{16}$" and the total length of the shank from the handle to the extreme end or tip of the shank may be 1½", the shank gradually tapering and being flattened at its lower part as shown in Figure 6 until the width of the extreme lower end of the cutting edge or blade 20 is approximately $\frac{3}{32}$" and the thickness of the shank is sufficient to permit the instrument to be readily flexed with the fingers, this flexure taking place from a point indicated approximately by the numeral 23, Figure 6, and extending downwardly to the extreme end 20 of the instrument. It will be understood, however, that the end 20 is not laterally flexible, that is to say, the shank between the extreme end and the point 23 is flexible but the flat end 22 is not laterally flexible so that the edges of this flat end may act as planing surfaces in the manner described above.

It will be observed from the foregoing that when using known instruments other than that herein described and claimed to remove deposit from the teeth that after the said deposits have been removed there is danger of continuing the abrading action and thereby removing part of the thin wall of the cementum which surrounds the surface of the tooth below the gum. This is caused by the fact that these instruments have lateral extensions forming teeth, blades or ridges, secured to a rigid shank so that if the operation is continued after the foreign deposit is removed, there is no way that the operator can tell that the cementum has been reached and no way to avoid cutting into the same.

As distinguished from the foregoing it will be evident that with the improved instrument herein described, there is no danger of injuring the cementum, for when the laterally extending deposit has been removed by the instrument, the smooth shank thereof merely slides along the surface of the cementum and as this shank does not have any laterally extending teeth or cutting surfaces it cannot gouge into and injure the cementum. The importance of this is obvious to those skilled in the art.

What is claimed is:

1. A dental instrument comprising a rigid handle and a shank extending therefrom and of increasing flexibility toward its extremity, said extremity having a flat end, the plane surface thereof being at substantially a right angle to the surface of said shank, said end forming a planing surface and having a cutting edge extending along a side thereof.

2. The dental instrument as claimed in claim 1 wherein said planing surface has laterally inflexible cutting edges extending along its longest sides.

3. The dental instrument as claimed in claim 1 wherein the planing surface is rectangular, the ratio of the width of the ends to the sides thereof being at least as 1:2.

4. A dental instrument comprising a handle having a circular shank of gradually tapering diameter toward its extremity, said shank being flexible and flattened through at least part of its length and the extremity thereof forming a flat end, the surface thereof being at substantially a right angle to the surface of said shank, said end forming a planing surface and having a cutting edge extending along a side thereof.

5. A dental instrument comprising a handle and a flexible shank extending therefrom and terminating in a rectangular planing surface, at substantially a right angle to the surface of said shank said surface forming the substantially flat end of said shank and having at least one cutting edge along one side thereof.

6. A dental instrument having a relatively thin shank adapted to fit between the outer surface of a tooth and the adjacent gum to cause minimum displacement to the latter, said instrument terminating in a flat planing surface adapted to locate deposits on the tooth by the "feel" of the instrument, said surface forming a flat end at the extremity of the instrument, said surface being at substantially a right angle to the surface of said shank and said surface having at least one cutting edge extending along one side thereof.

7. In a dental instrument for removing deposits from the surface of a tooth below the gum line, a rigid handle, a relatively thin flexible shank carried by said handle, and a flat surface on the end thereof at a right angle with an adjacent flat surface of said shank to form a planing edge therewith; said shank being normally curved and said edge forming the terminus of the concave side of the curve, whereby a dentist may, with said edge against the surface wall of the tooth, apply lateral pressure via said handle to straighten the curve of said shank so that when longitudinal pressure is applied to the instrument, said edge will smoothly follow said surface between the tooth and the gum with a minimum displacement of the latter, and thereby said deposits may be located by the "feel" of the instrument and planed off by manipulating the instrument to repetitively move said edge across the deposit until it is entirely removed.

8. An instrument according to claim 7 in which the lateral surfaces at said end of said shank form substantially a rectangle.

JOHN LAWRENCE KELLY.